(12) United States Patent
Strom et al.

(10) Patent No.: US 10,550,988 B2
(45) Date of Patent: Feb. 4, 2020

(54) CIPP LINER REEL SYSTEM

(71) Applicant: Subsurface, Inc., Moorhead, MN (US)

(72) Inventors: Gary H. Strom, Moorhead, MN (US); Brandon G. Strom, Moorhead, MN (US)

(73) Assignee: Subsurface, Inc., Moorhead, MN (US)

( * ) Notice: Subject to any disclaimer, the term of this patent is extended or adjusted under 35 U.S.C. 154(b) by 379 days.

(21) Appl. No.: 15/463,228

(22) Filed: Mar. 20, 2017

(65) Prior Publication Data

US 2018/0266615 A1    Sep. 20, 2018

(51) Int. Cl.
| | |
|---|---|
| *F16L 55/18* | (2006.01) |
| *F16L 55/165* | (2006.01) |
| *B65H 75/14* | (2006.01) |
| *B65H 75/28* | (2006.01) |
| *B65H 75/42* | (2006.01) |
| *B65H 75/44* | (2006.01) |

(52) U.S. Cl.
CPC ............ *F16L 55/18* (2013.01); *B65H 75/146* (2013.01); *B65H 75/28* (2013.01); *B65H 75/425* (2013.01); *B65H 75/446* (2013.01); *B65H 75/4489* (2013.01); *F16L 55/1652* (2013.01); *B65H 2701/33* (2013.01)

(58) Field of Classification Search
CPC ..................................................... B65H 75/146
See application file for complete search history.

(56) References Cited

U.S. PATENT DOCUMENTS

| | | |
|---|---|---|
| 4,685,983 A | 8/1987 | Long, Jr. |
| 4,773,666 A | 9/1988 | Koberlein |
| 5,201,406 A | 4/1993 | Kellis |
| 6,390,795 B1 | 5/2002 | Waring |
| 6,439,445 B1 | 8/2002 | De Grootr |
| 6,960,313 B2 | 11/2005 | Waring |
| 7,374,127 B2 | 5/2008 | Gallagher |
| 7,476,348 B2 | 1/2009 | Waring |
| 7,682,106 B1 | 3/2010 | Bowar |

(Continued)

FOREIGN PATENT DOCUMENTS

DE    19702854    7/1998

OTHER PUBLICATIONS http://cipp-services.com/air-inverters.html, Webpage from CIPP Services, Inc., Downloaded and Printed on Apr. 13, 2013.

(Continued)

*Primary Examiner* — Ryan M Ochylski
(74) *Attorney, Agent, or Firm* — Neustel Law Offices

(57) ABSTRACT

A CIPP liner reel system for managing the utilization and deployment of CIPP liners. The CIPP liner reel system generally includes a frame connected to a reel and drive unit. The drive unit is connected to the reel to control the rotation of its core. This core contains an opening that provides access to a connector unit within the core. This connector unit can be used to connect the reel to the end of a CIPP liner using a strap. Rotation of the core causes CIPP liner to wind on to or unwind from the reel. The reel may also contain a left guide member and a right guide member to assist in controlling the process of winding and unwinding the CIPP liner. The frame may also include a tractor connector that enables the CIPP liner reel system to be coupled to and transported by a tractor without affecting its operation.

20 Claims, 18 Drawing Sheets

(56) References Cited

U.S. PATENT DOCUMENTS

| | | |
|---|---|---|
| 7,988,437 B1 | 8/2011 | Bonanotte |
| 8,418,336 B2 | 4/2013 | Bennett |
| 2002/0163102 A1 | 11/2002 | Thompson |
| 2003/0024858 A1 | 2/2003 | Stibbard |
| 2003/0146333 A1* | 8/2003 | Couchey .............. B65H 75/148 242/476.1 |
| 2007/0029688 A1 | 2/2007 | Delaney |
| 2011/0180639 A1 | 7/2011 | Lester |
| 2012/0199276 A1 | 8/2012 | Rodenberger |
| 2012/0273607 A1* | 11/2012 | Bensen, IV ............ B65H 54/20 242/603 |
| 2013/0263443 A1 | 10/2013 | Delaney |

OTHER PUBLICATIONS http://cipp-services.com/refrigerated-trucks.html, Webpage from CIPP Services, Inc., Downloaded and Printed on Apr. 16, 2013.

\* cited by examiner

CIPP LINER REEL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a cured-in-place pipe (CIPP) liner reel system for managing the utilization and deployment of CIPP liners.

Related Art

Cured-in-place pipe (CIPP) liners have been used for many years for the rehabilitation of different types and sizes of conduit and piping systems such as utility, sewer, water, electric, telecom, industrial, petroleum, fire suppression, heating, cooling and the like. The majority of materials used to manufacture these liners is felt and fleece type fabrics which have a thin flexible PVC or Polyurethane type jacket coating on one side. The liners are usually impregnated with a thermosetting type resin then installed by inverting the liner inside of the host conduit or pipe with air or water.

Recently, ultraviolet (UV) cured-in-place pipe liners are another type of CIPP liner that utilize UV light to cure the CIPP liner inside of a conduit. UV cured CIPP liners are bulky and relatively heavy to work with. Furthermore, UV cured CIPP liners need to be handled carefully because if the outer protective layer is damaged or partially removed, the UV cured CIPP liner will harden within minutes when exposed to sunlight. U.S. Pat. No. 8,580,364 to Quitter illustrates an exemplary UV cured CIPP liner.

There are many ways of inserting a CIPP liner into a host pipe, including pulling the liner through the host pipe from the opposite end. The CIPP liner is often times transported to the installation site and directly dispensed into the host pipe. If that is not possible, an appropriate length of CIPP liner can be removed from its transport and placed near the insertion point. However, when the size of the host pipe is very large, it can be difficult to move a sufficiently large section of CIPP liner to the insertion point. In some cases, the CIPP liner can simply be pulled the entire distance between the transport and the insertion point. The excess CIPP liner is either returned to the transport or discarded, if it has become damaged. Another alternative is to move a liner box containing CIPP liner closer to the insertion point using a tractor. However, if the amount of CIPP liner needed is much smaller than the amount contained in a liner box, the needed amount must either be separated from the box, or excess CIPP liner material must be moved to the insertion point only to be returned to the transport. In addition, it can be difficult to dispense CIPP liner directly from a liner box because it is typically stored using an accordion fold.

Because of the inherent problems with the related art, there is a need for a new and improved way of dispensing a CIPP liner for efficient usage of a CIPP liner.

SUMMARY

An example embodiment is directed to a CIPP liner reel system. The CIPP liner reel system generally includes a frame connected to a reel and drive unit. The drive unit is connected to the reel to control the rotation of its core. This core contains an opening that provides access to a connector unit within the core. This connector unit can be used to connect the reel to the end of a CIPP liner using a strap. Rotation of the core causes CIPP liner to wind on to or unwind from the reel. The reel may also contain a left guide member and a right guide member to assist in controlling the process of winding and unwinding the CIPP liner. The frame may also include a tractor connector that enables the CIPP liner reel system to be coupled to and transported by a tractor without affecting its operation.

There has thus been outlined, rather broadly, some of the embodiments of the CIPP liner reel system in order that the detailed description thereof may be better understood, and in order that the present contribution to the art may be better appreciated. There are additional embodiments of the CIPP liner reel system that will be described hereinafter and that will form the subject matter of the claims appended hereto. In this respect, before explaining at least one embodiment of the CIPP liner reel system in detail, it is to be understood that the CIPP liner reel system is not limited in its application to the details of construction or to the arrangements of the components set forth in the following description or illustrated in the drawings. The CIPP liner reel system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
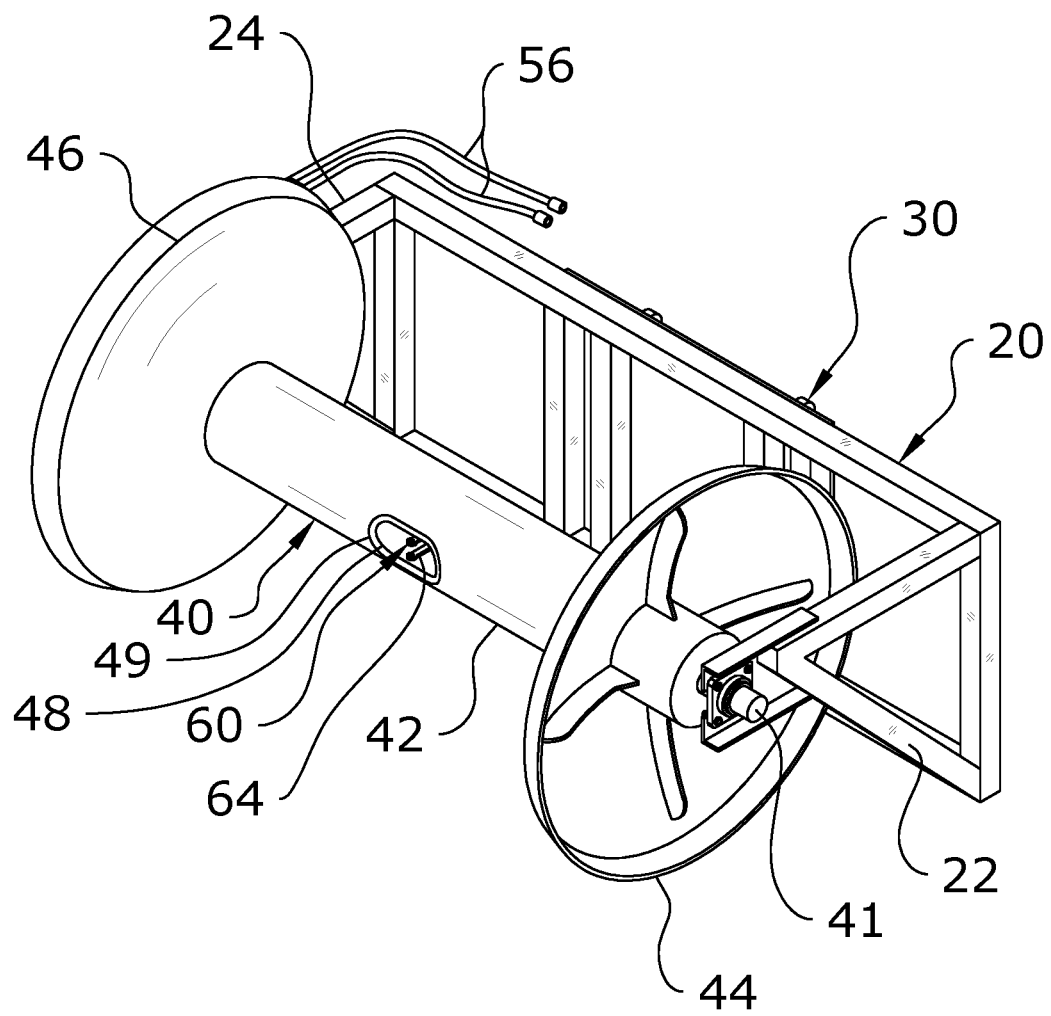
FIG. 1 is a perspective view of a CIPP liner reel system in accordance with an example embodiment.
Figure 2:
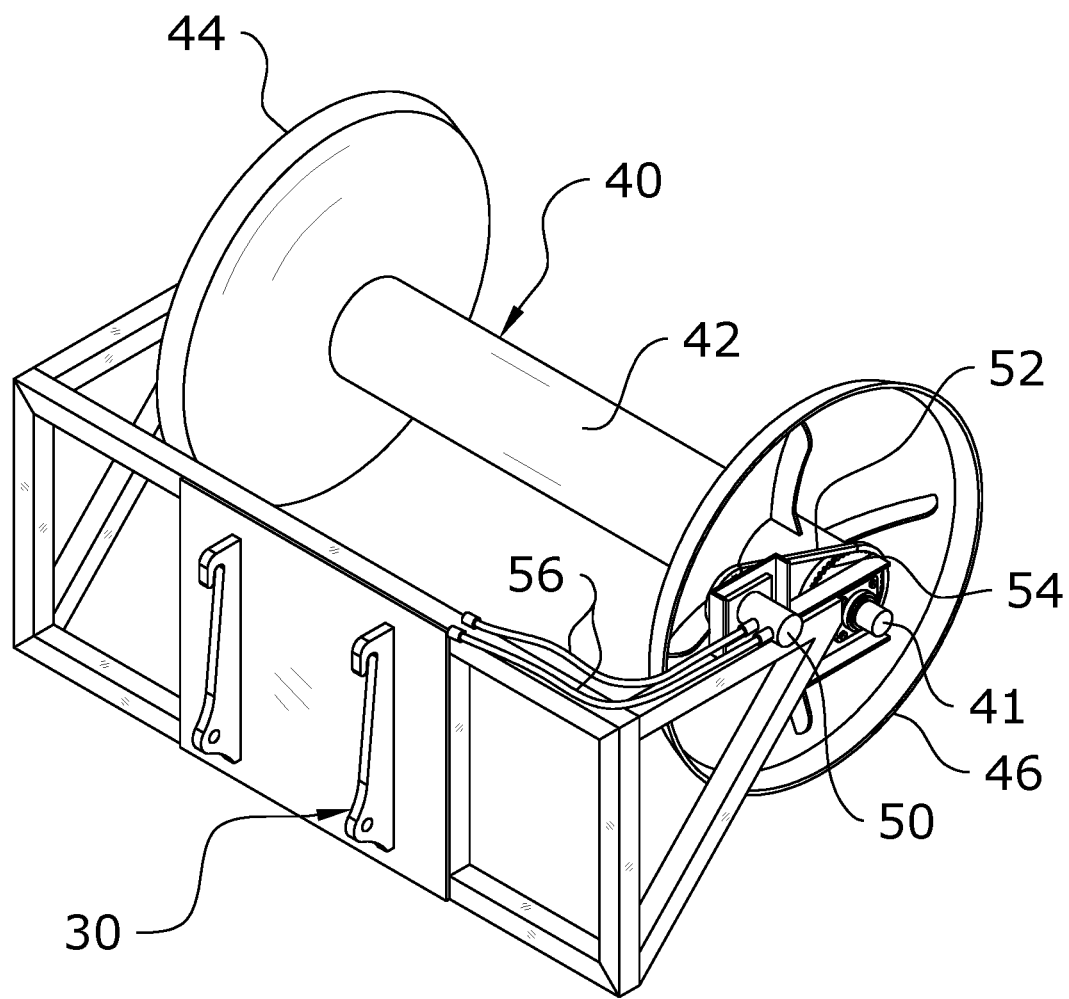
FIG. 2 is an alternate perspective view of a CIPP liner reel system in accordance with an example embodiment.
Figure 3:
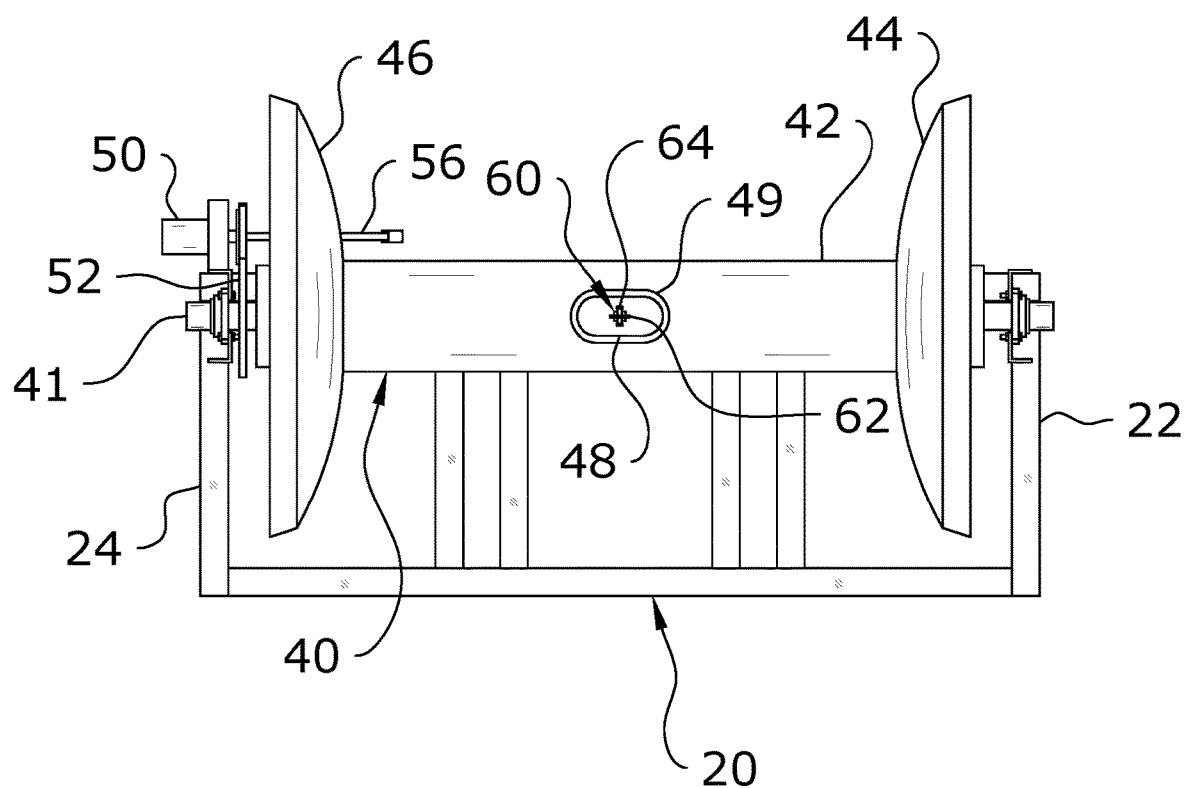
FIG. 3 is a front-side view of a CIPP liner reel system in accordance with an example embodiment.
Figure 4:
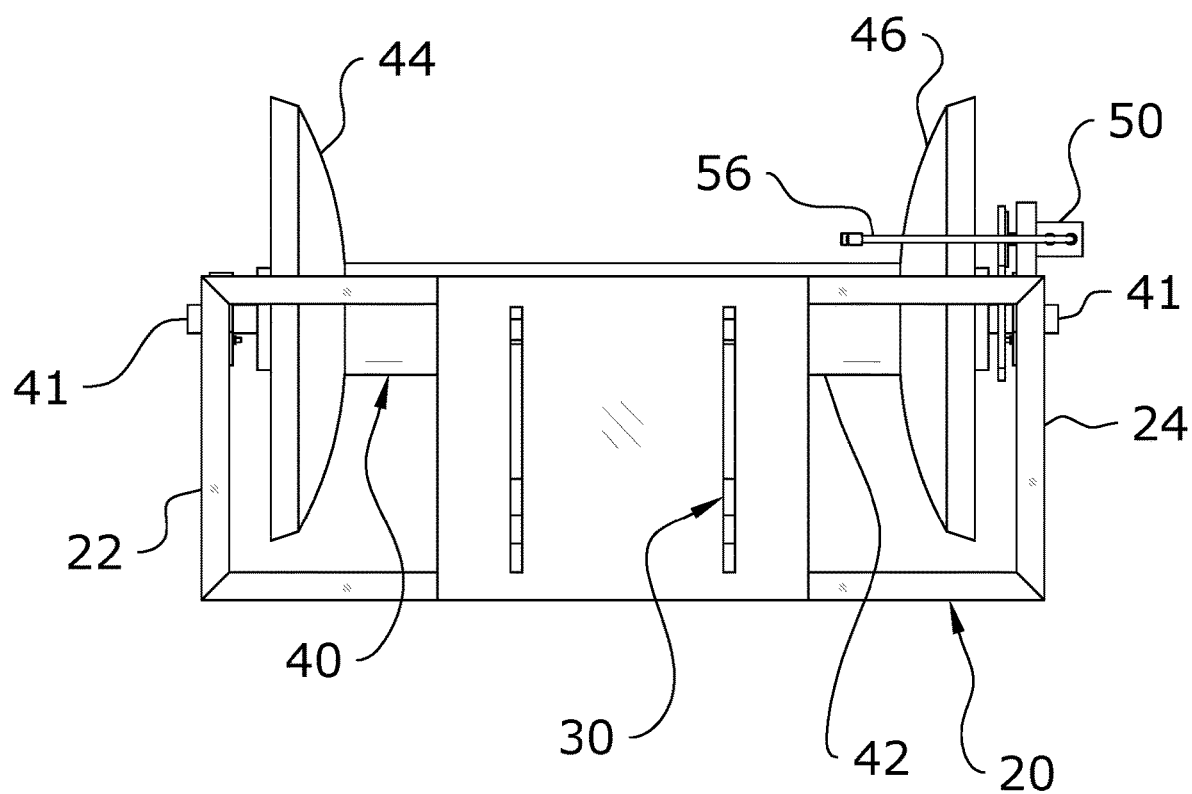
FIG. 4 is a back-side view of a CIPP liner reel system in accordance with an example embodiment.
Figure 5:
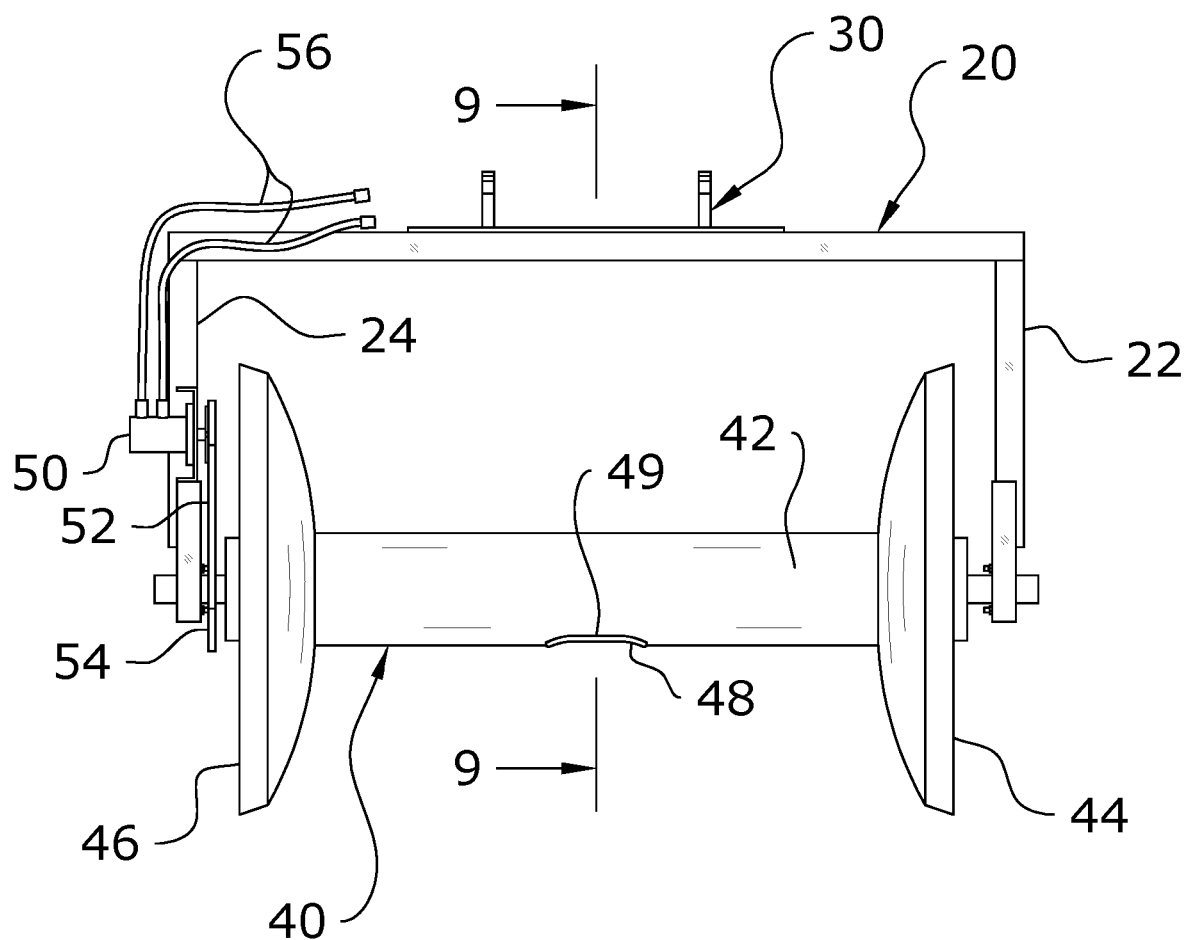
FIG. 5 is a top-down view of a CIPP liner reel system in accordance with an example embodiment.
Figure 6:
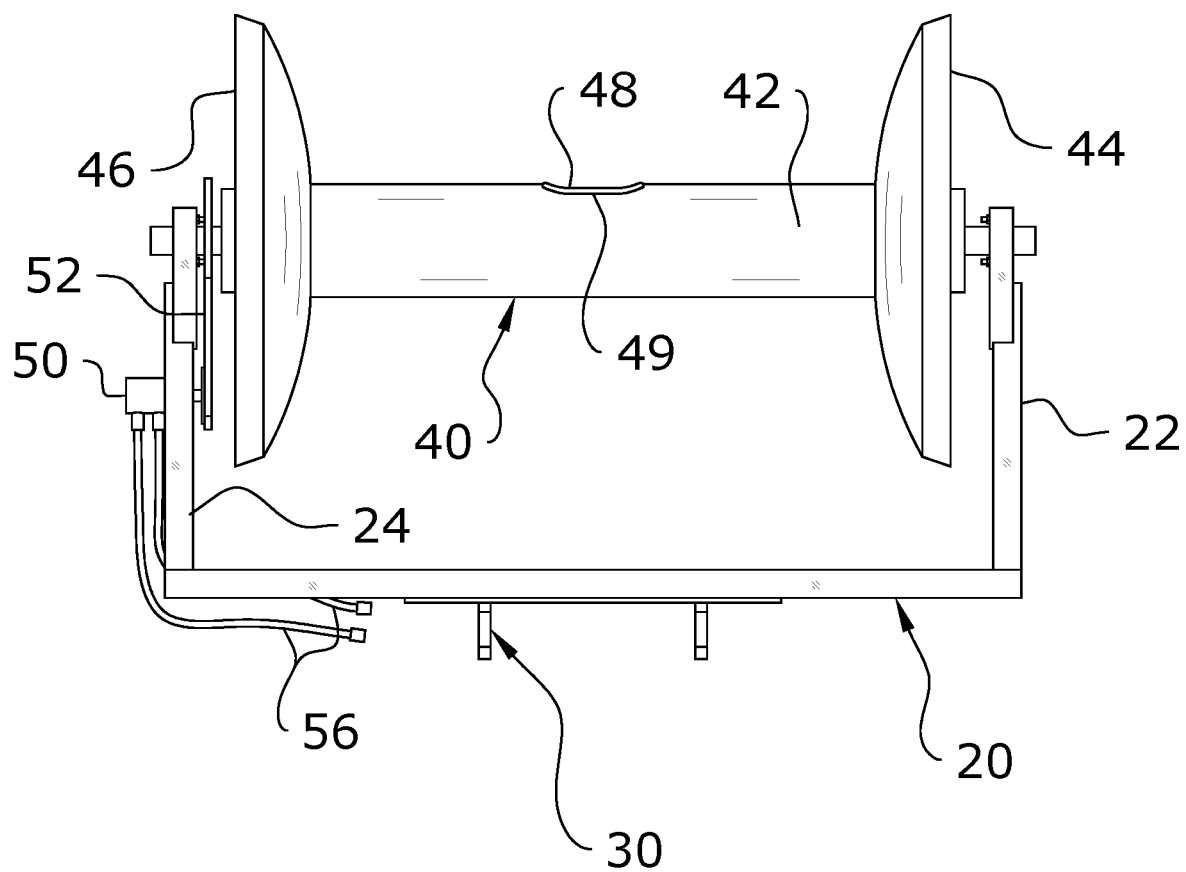
FIG. 6 is a bottom-up view of a CIPP liner reel system in accordance with an example embodiment.
Figure 7:
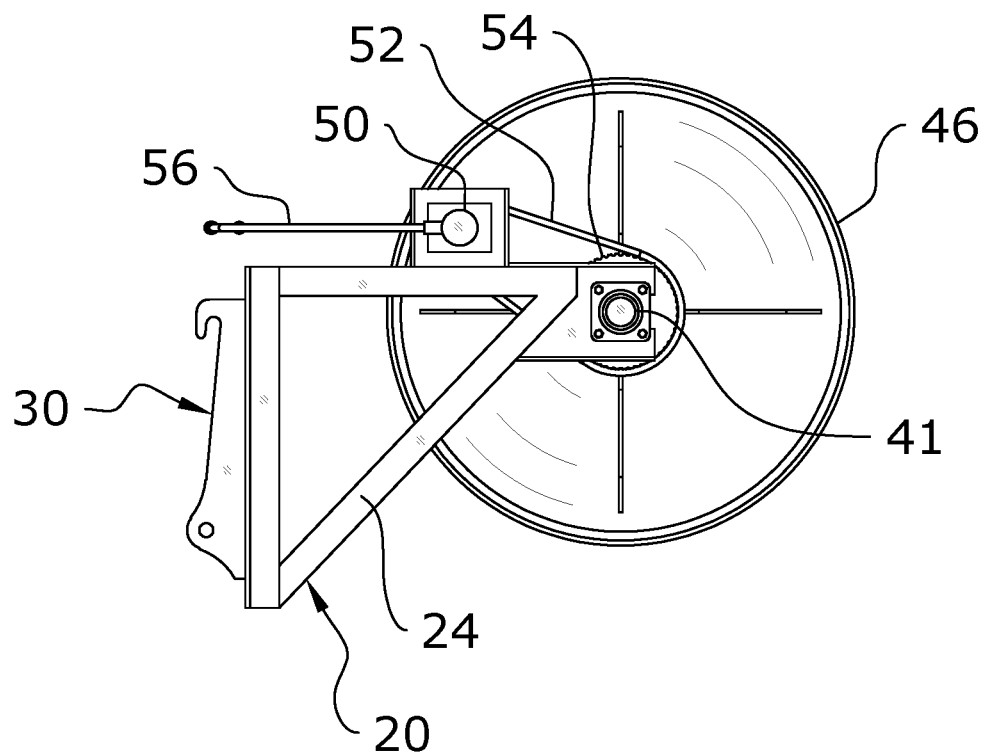
FIG. 7 is a right-side view of a CIPP liner reel system in accordance with an example embodiment.
Figure 8:
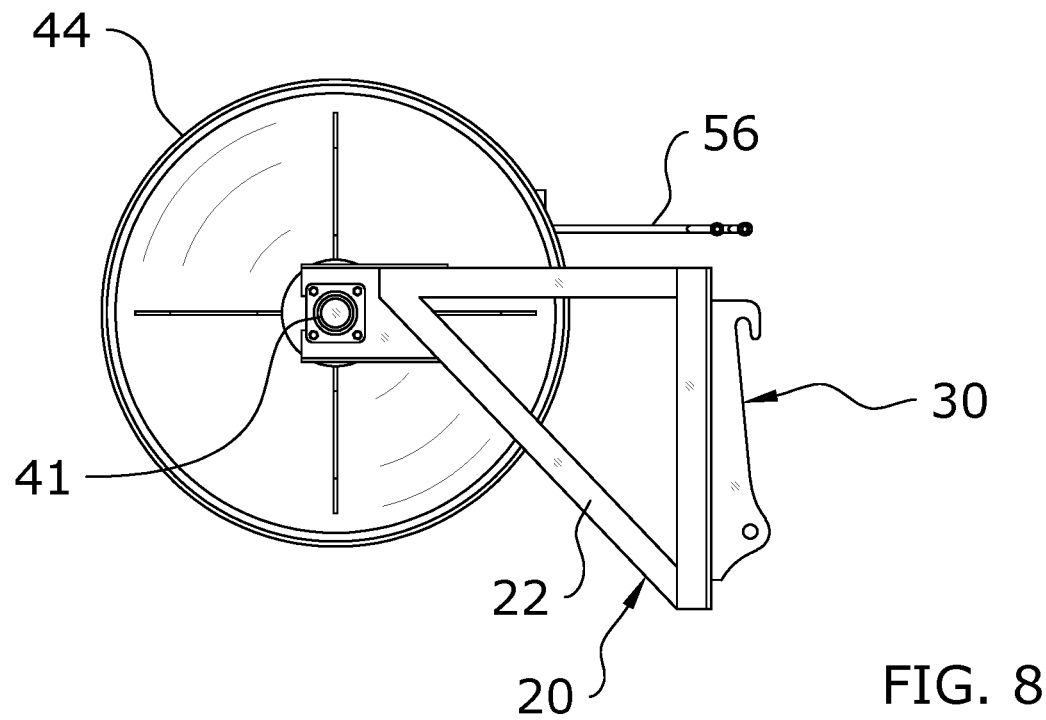
FIG. 8 is a left-side view of a CIPP liner reel system in accordance with an example embodiment.
Figure 9:
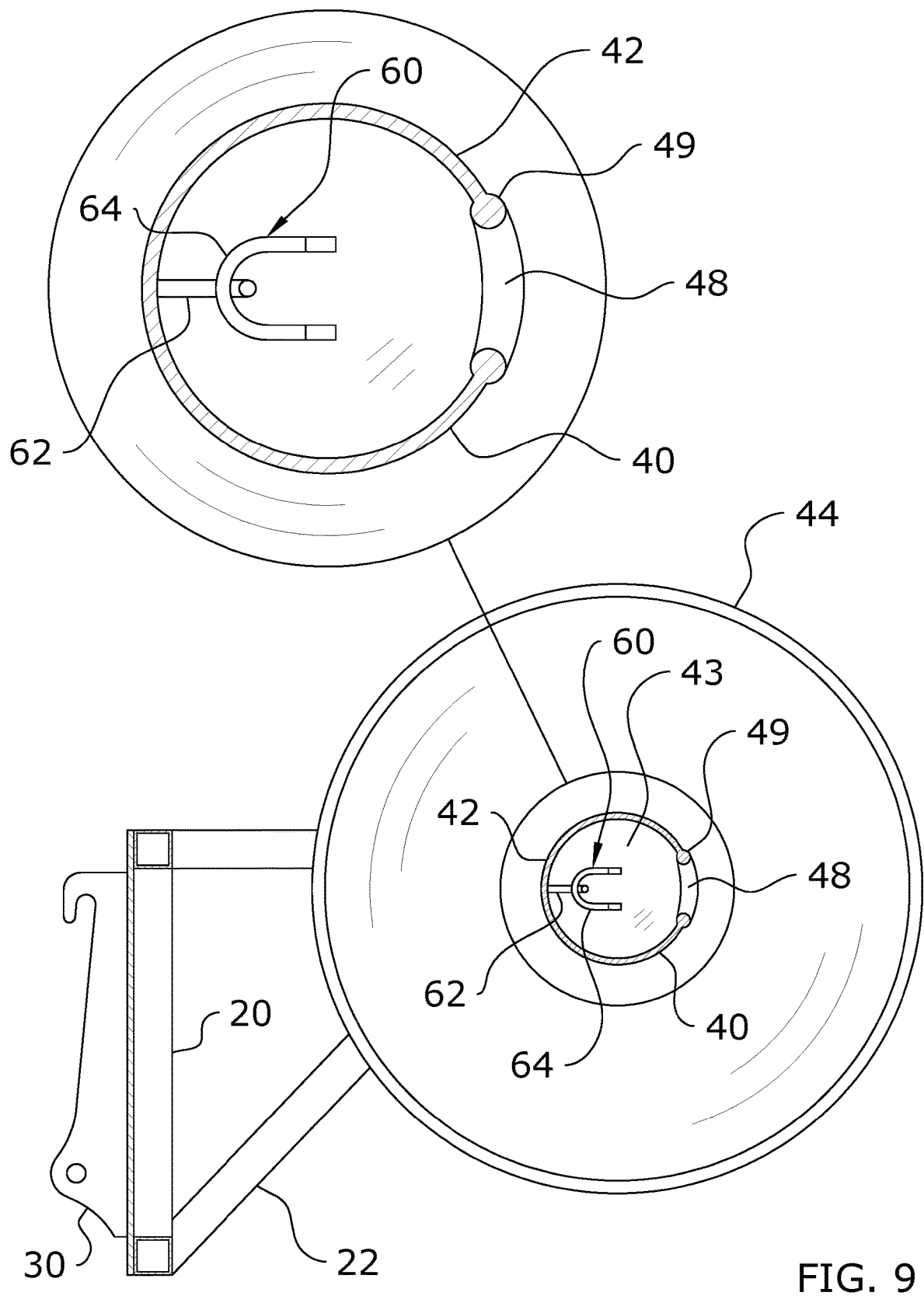
FIG. 9 is a cross-section view a CIPP liner reel system in accordance with an example embodiment at the point indicated in FIG. 5, including an exploded view of the core of the CIPP liner reel system.
Figure 10:
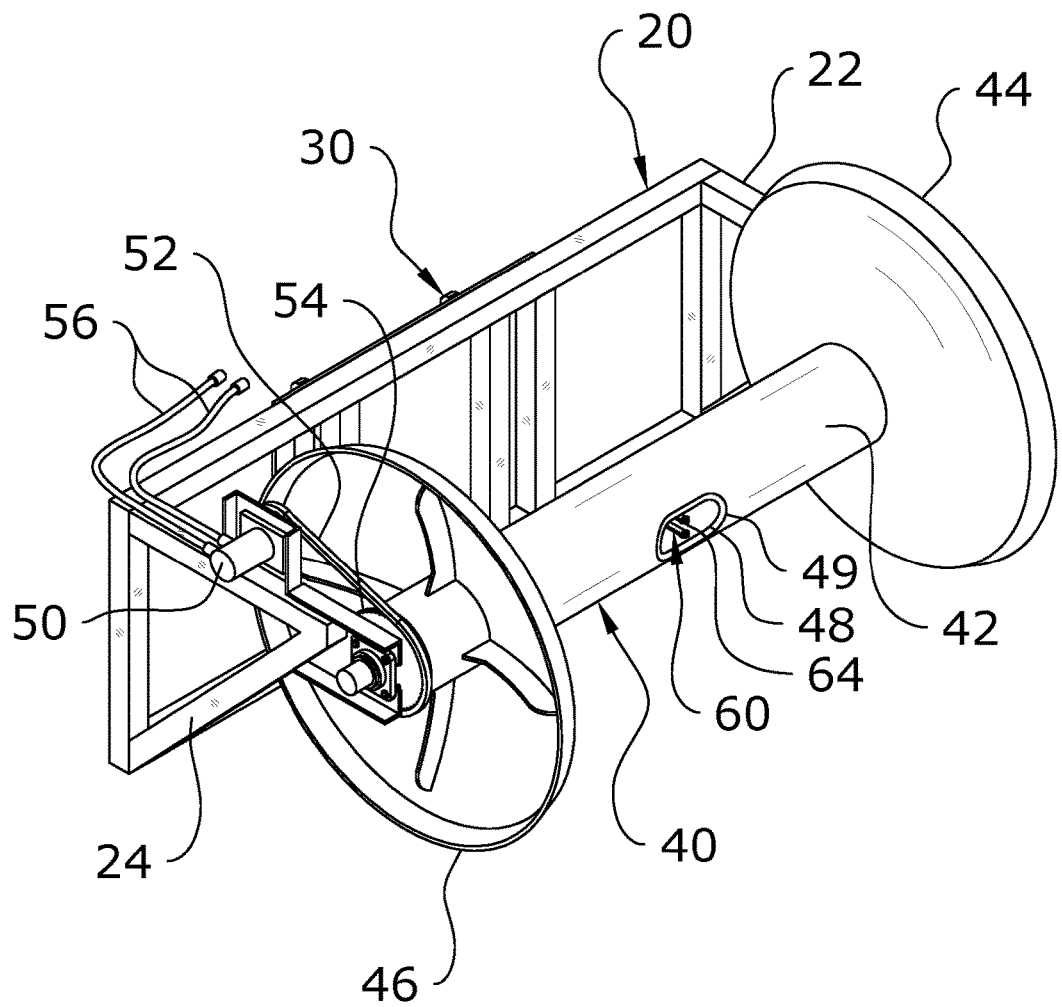
FIG. 10 is an alternate perspective view of a CIPP liner reel system in accordance with an example embodiment.
Figure 11:
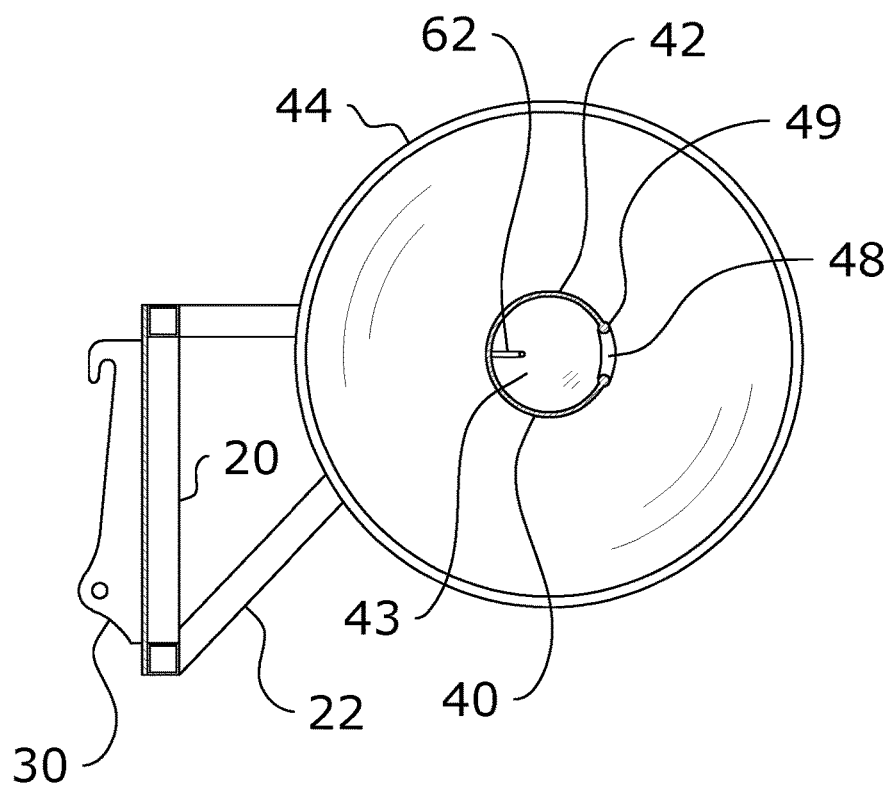
FIG. 11 is a right-side cross-section view of a CIPP liner reel system in accordance with an example embodiment.

A. Overview.

Turning now descriptively to the drawings, in which similar reference characters denote similar elements throughout the several views, FIGS. 1 through 21 illustrate a CIPP liner reel system, which comprises a frame 20 connected to a reel 40. A drive unit 50 is attached to frame 20 and connected to reel 40 to control the rotation of its core 42. Core 42 contains an opening 48 that provides access to a connector unit 60 within the core 42 that can be used to connect the reel 40 to a cured-in-place pipe (CIPP) liner 10 using a strap 12. Rotation of core 42 causes CIPP liner 10 to wind on to or unwind from reel 40. Left guide members 44 and right guide members 46 assist in controlling the process of winding and unwinding CIPP liner 10. The frame 20 may also include a tractor connector 30 that enables the CIPP liner reel system to be coupled to and transported by a tractor without affecting its operation. The CIPP liner may be comprised of various types of CIPP liners including, but not limited to, UV cured CIPP liners.

B. Reel

FIGS. 1 through 19 illustrate an exemplary cured-in-place pipe (CIPP) liner reel system having a frame 20, reel 40, and drive unit 50. Reel 40 comprises a left guide member 44, right guide member 46, and a core 42. The core 42 comprises a connector unit 60 that can be accessed via an opening 48. If a CIPP liner 10 is coupled to the connector unit 60, possibly using a strap 12, rotation of reel 40 will cause the CIPP Liner 10 to wind around core 42.

Core 42 is shaped as a right circular cylinder, meaning that it has a circular cross-section and both of its ends are parallel to each other. In this embodiment, because of its shape, the central axis of rotation of core 42 extends from the exact center of one end to the exact center of the opposing end. However, core 42 need not be comprised of a single cylinder. In other embodiments, the axis of rotation does not pass through the core 42. In other embodiments, core 42 is separated into a plurality of separate pieces that each span the distance between the left guide member 44 and the right guide member 46.

Left guide member 44 has a circular profile and a meniscus shape meaning that one side is convex and the other side is concave. The concave side of left guide member 44 contains four supporting spines. Right guide member 46 has a similar shape. Both the left guide member 44 and the right guide member 46 have their convex sides attached to core 42. In some embodiments, guide members 44,46 are attached to core 42 in a manner where guide members 44,46 and core 42 rotate in unison. In other embodiments, core 42 can rotate independently of the left guide member 44, the right guide member 46, or both.

Left guide member 44 is attached to the left side 22 of frame 20 using an end axle 41. Similarly, right guide member 46 is attached to the right side 24 of frame 20 using another end axle 41. The end axles 41 are coupled to core 42 such that rotation of the end axles 41 will cause the core 42 to rotate in the same direction. The respective end axles 41 are disposed within respective bushings on the left side 22 and right side 24 of the frame 20. These bushings allow core 42 to easily rotate relative to the frame 20. In other embodiments, ball bearings are used in place of these bushings.

Core 42 is hollow meaning that interior 43 is substantially free of solid material. As best shown, in FIG. 9, interior 43 contains a connector unit 60. Connector unit 60 comprises a first connector 62 and a second connector 64. First connector 62 is securely attached to the interior surface of core 42. First connector 62 is further attached to a second connector 64. In some embodiments, second connector 64 is removably attached to first connector 62. In other embodiments, second connector 64 is attached to first connector 62 in a manner that permits second connector 64 to rotate or pivot. Second connector 64 is adapted for connection to external connectors such as strap 12. Second connector 64 can also be used for attachment of clamps, hooks or other removable attachments. In other embodiments, connector unit 60 is comprised of a single connector.

Figure 12:
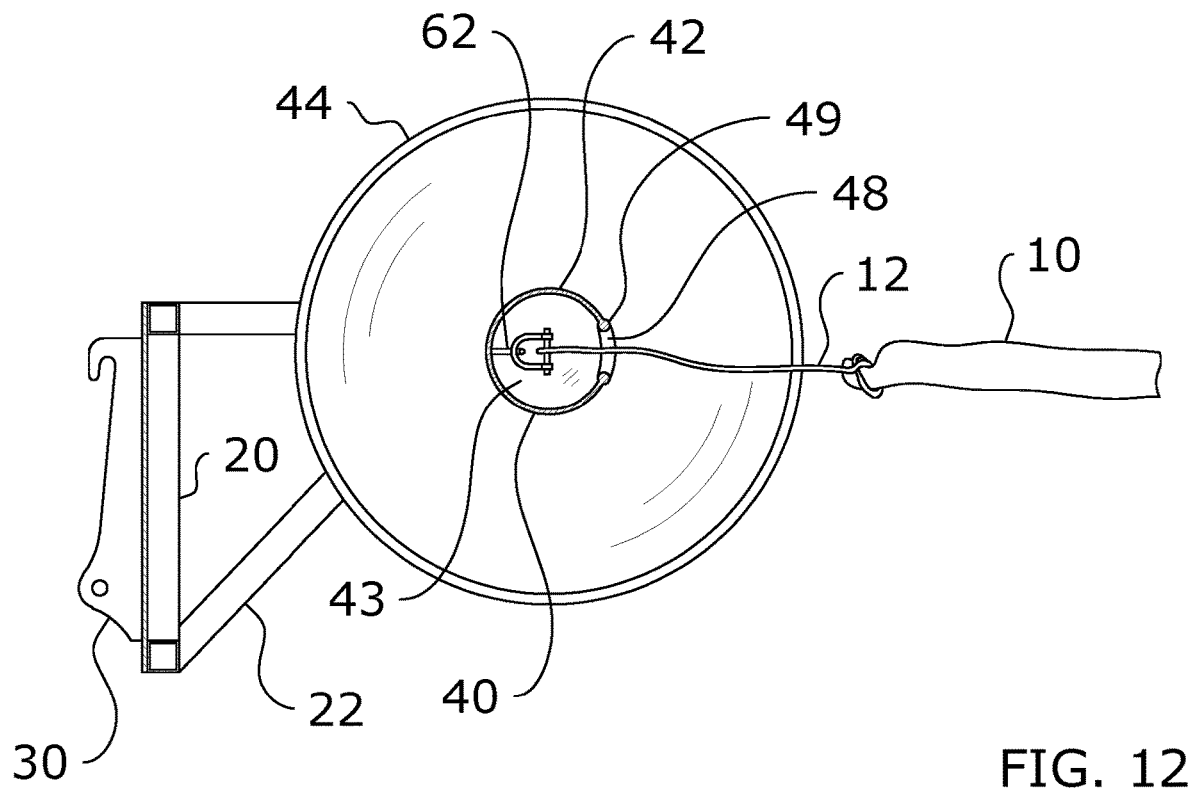
FIG. 12 is a right-side cross-section view of a CIPP liner reel system in accordance with an example embodiment that is coupled to a CIPP liner using a strap.

Core 42 contains an opening 48 that provides access to connector unit 60. For example, as shown in FIG. 12, a strap 12 can be connected to connector unit 60 via opening 48. Opening 48 may also comprise a rounded lip 49 that is configured to prevent sharp edges that might rip or tear of CIPP liner 10 or strap 12. In other embodiments, opening 48 leads to a depression or concave region within core 42 and not the entire interior 43. In this type of embodiment, connector unit 60 is disposed within this depression or concave region and attached thereto.

Figure 20:
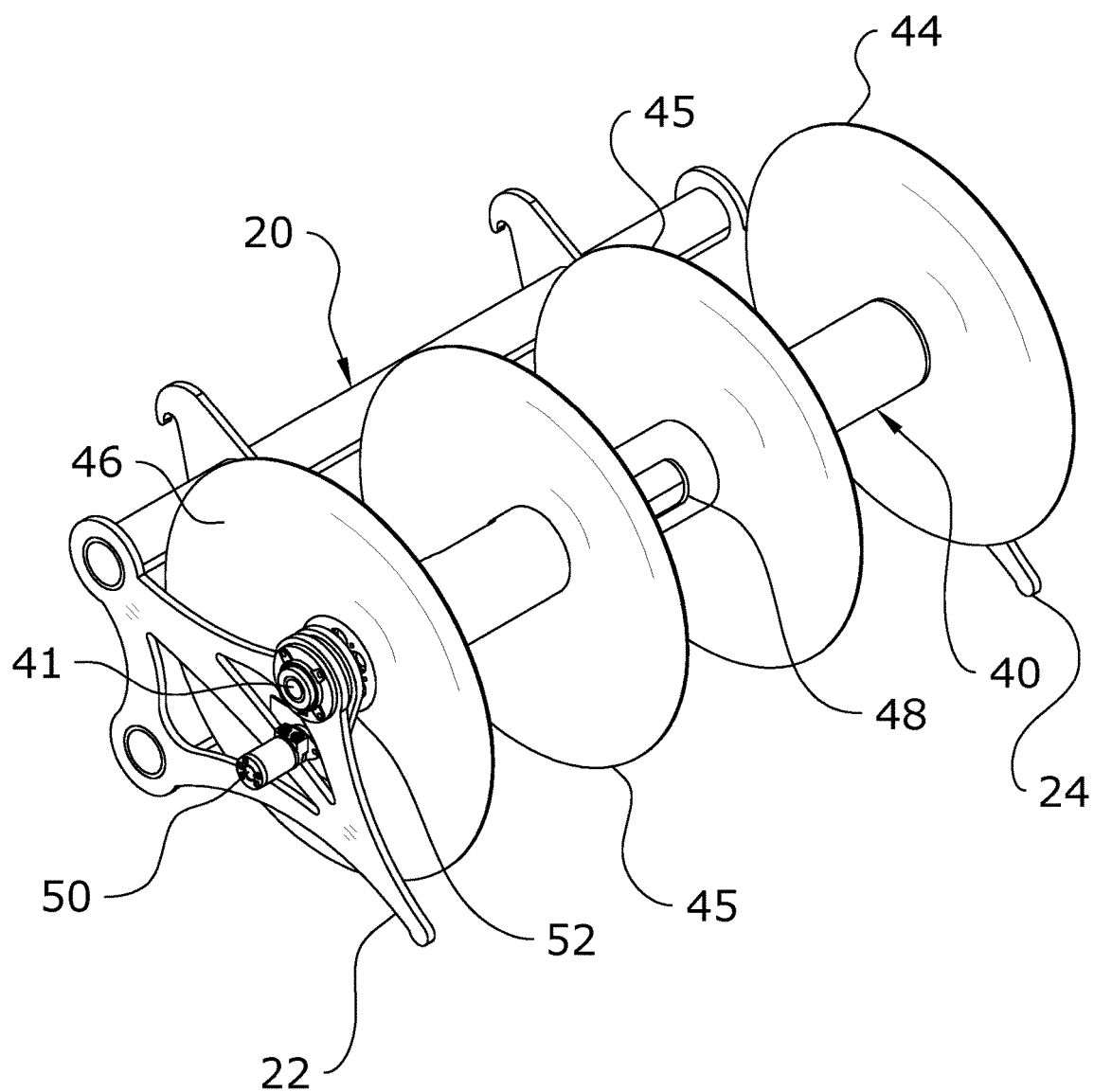
FIG. 20 is a perspective view of a CIPP liner reel system in accordance with an example embodiment comprising intermediate guide members.
Figure 21:
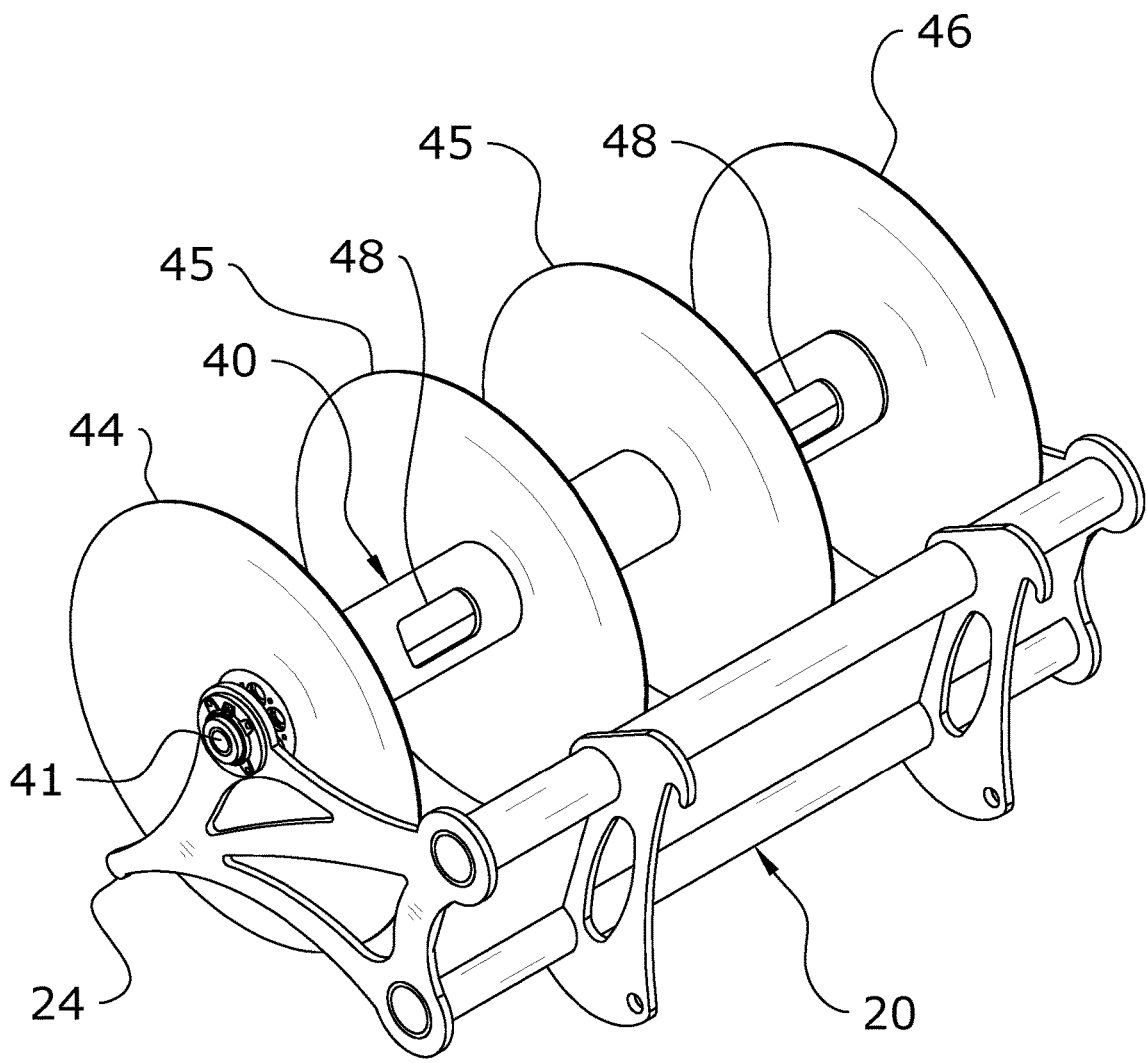
FIG. 21 is an alternate perspective view of a CIPP liner reel system shown in FIG. 20.

FIGS. 20 and 21 illustrate an alternate embodiment of a CIPP liner reel system comprising two intermediate guide members 45. The two intermediate guide members 45 functionally divide the core 42 into three regions. Core 42 comprises three openings 48 with each opening 48 providing access to a connector unit 60 (not shown). The openings 48 do not have to be aligned with each other. As shown in FIGS. 20 and 21, the middle opening 48 is on the side opposite the two outer openings 48 with the two outer openings 48 being aligned with each other. In some embodiments, intermediate guide members 45 can be detached or reattached to core 42. In other embodiments, intermediate guide members 45 can be repositioned on core 42 to move closer or farther away from left guide member 44, for example. In some embodiments, intermediate guide members 45 are convex on both sides. In some embodiments, intermediate guide member 45 is configured to become flush with either left guide member 44 or right guide member 46.

C. Frame

Figure 17:
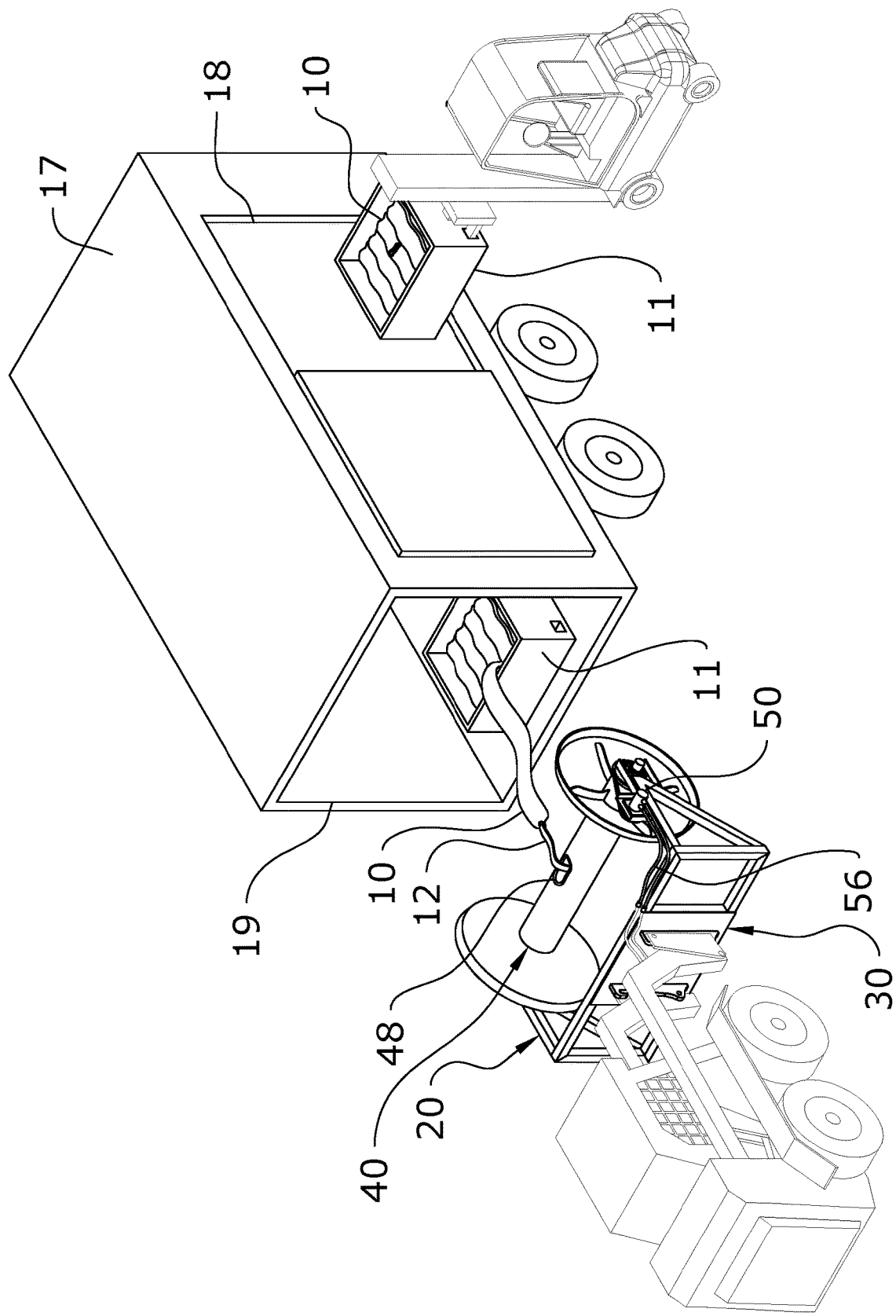
FIG. 17 illustrates the use of a CIPP liner reel system in accordance with an example embodiment to extract CIPP liner from a liner box within a storage container and wind the CIPP liner around the core of the CIPP liner reel system.
Figure 18:
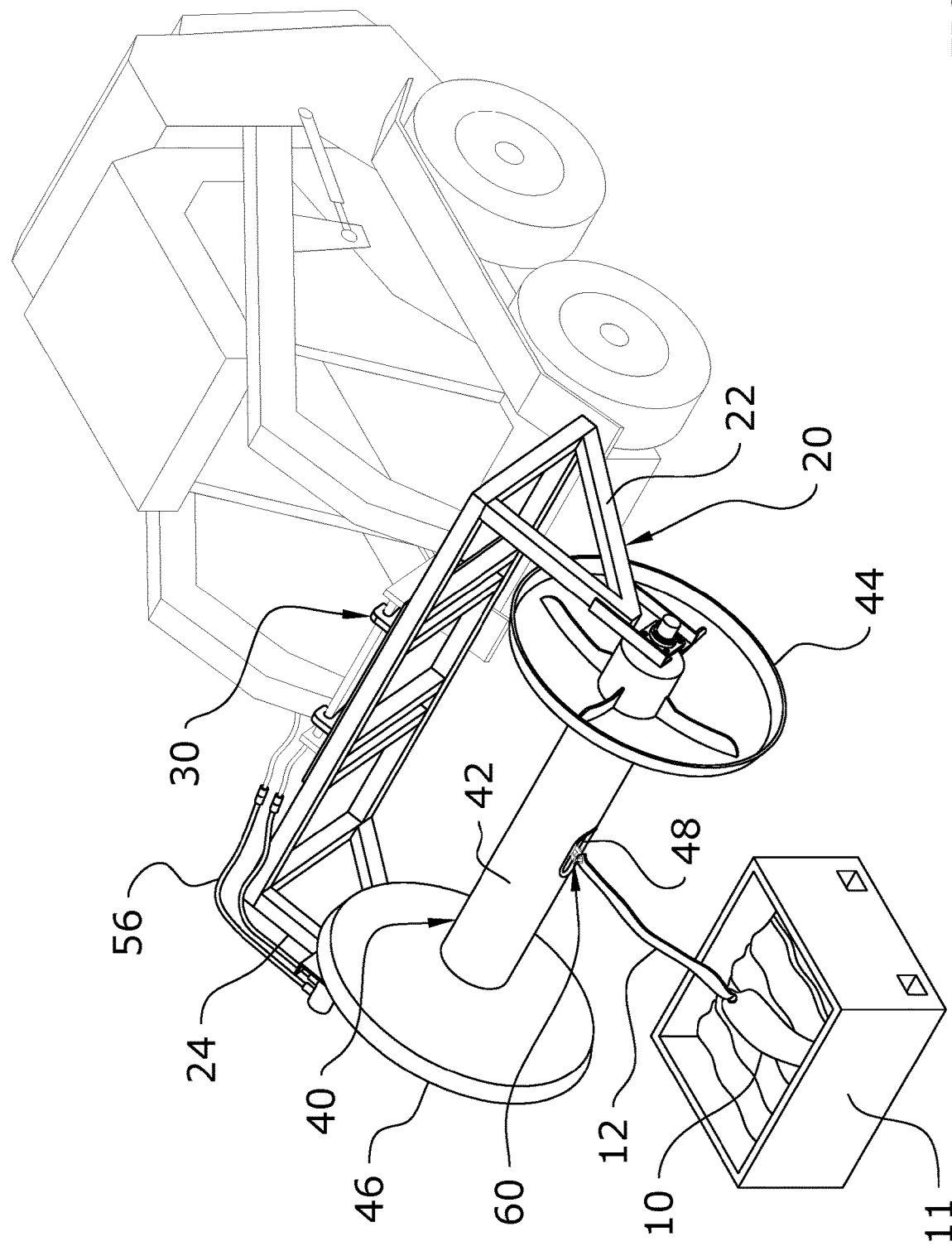
FIG. 18 illustrates the use of a CIPP liner reel system in accordance with an example embodiment to extract CIPP liner from a liner box on the ground and wind the CIPP liner around the core of the CIPP liner reel system.
Figure 19:
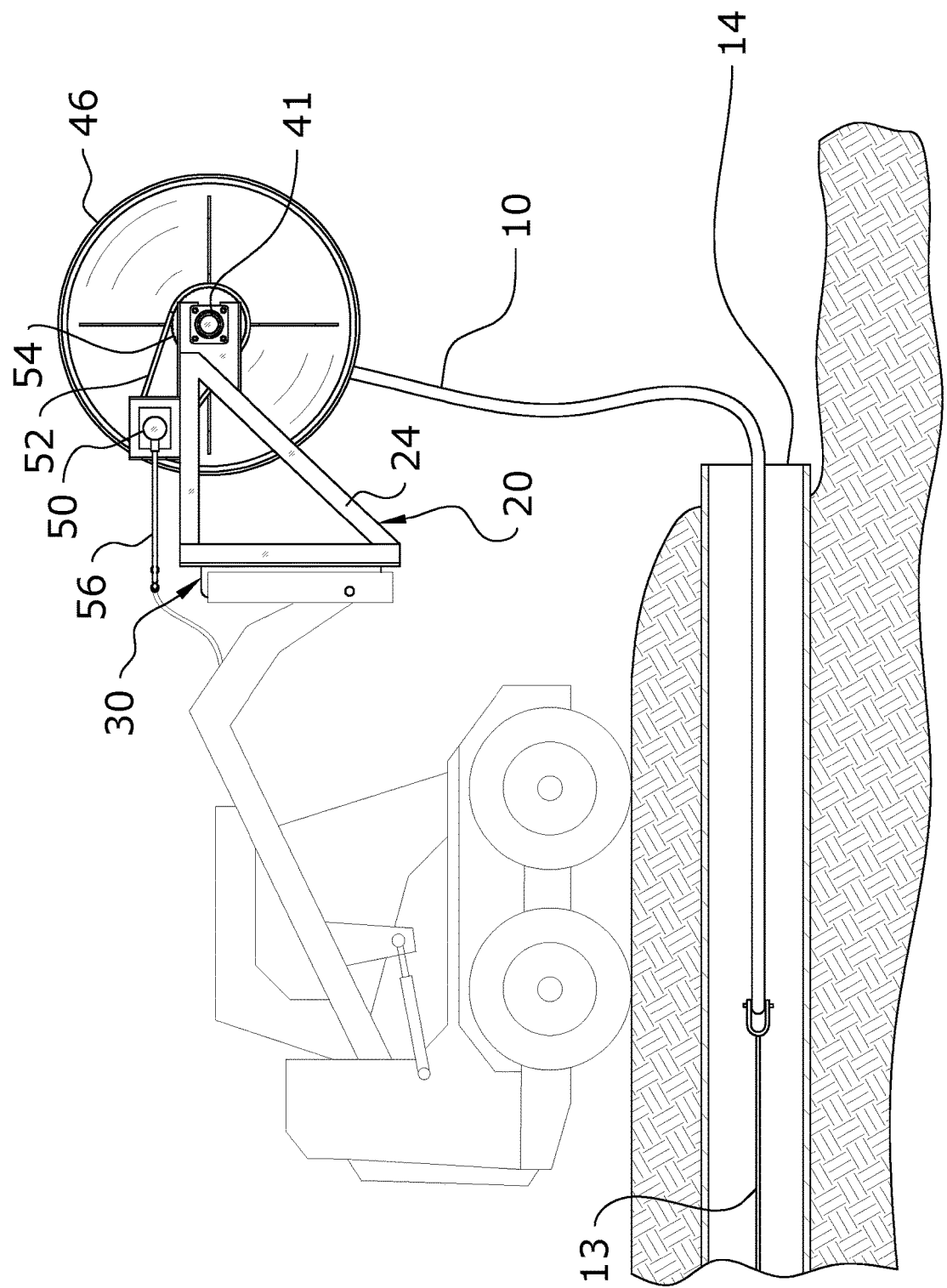
FIG. 19 is a right-side view of CIPP liner being dispensed from a CIPP liner reel system in accordance with an example embodiment and inserted into an access opening.

FIGS. 1 through 21 illustrate a frame 20 that can be used to operatively support a reel 40 and drive unit 50. Frame 20 comprises a left side 22 and a right side 24. Left side 22 is attached to end axle 41 of left guide member 44 using a bushing. Similarly, right side 24 is attached to end axle 41 of right guide member 46 using a bushing. Frame 20 further comprises a securely attached tractor connector 30. As shown in FIGS. 17 through 19, tractor connector 30 is configured to allow a tractor to couple with and lift the CIPP liner reel system.

D. Drive Unit

Drive unit 50 is operatively coupled to reel 40 and configured to control the rotation of core 42. Drive unit 50 can cause reel 40 to rotate clockwise or counter-clockwise. Drive unit 50 can also be configured to allow reel 40 to rotate freely. Drive unit 50 can also be configured to inhibit rotation of reel 40. When drive unit 50 is a hydraulic motor, it can be controlled and powered using hydraulic lines 56. For example, in the embodiment shown in FIG. 17, hydraulic lines 56 are coupled to a tractor to enable the operator of the tractor to control the drive unit 50.

Sprocket 54 is attached to the end axle 41 on the right side 24 of frame 20 such that the rotation of sprocket 54 is coupled to the rotation of reel 40. Sprocket 54 is coupled to drive unit 50 via a chain 52. The drive unit 50 controls the motion of chain 52 which controls the rotation of sprocket 54 which ultimately controls the rotation of reel 40. In other embodiments, drive unit 50 is coupled to end axle 41 using a belt. In other embodiments, drive unit 50 is directly coupled to end axles 41.

If core 42 is coupled to a CIPP liner 10, drive unit 50 can wind CIPP liner 10 around core 42 by causing reel 40 to rotate in one direction. Drive unit 50 can unwind CIPP liner 10 from core 42 by causing reel 40 to rotate in the opposite direction. CIPP liner 10 can be wound around core 42 in either direction. However, unwinding will be in the direction opposite of the direction used to wind the CIPP liner 10 around the core 42. In some embodiments, drive unit 50 can be disengaged in a manner that allows the reel 40 to spin freely within frame 20. In this embodiment, CIPP liner 10 can be unwound from core 42 by pulling on the exposed end of the CIPP liner 10. In other embodiments, drive unit 50 can be set to a brake mode (using an internal brake mechanism), which prevents reel 40 from rotating within frame 20 which makes the process of unwinding safer and lessens the risk of damaging the CIPP liner or injury. With a hydraulic motor used for the drive unit 50 that has an internal brake mechanism, as soon as the hydraulic pressure flow is shutoff to the hydraulic motor the brake automatically engages. U.S. Pat. No. 6,345,968 to Shupe discloses a Hydraulic Motor with Brake Assembly which illustrates an exemplary drive unit 50 suitable for use with the various embodiments of the present invention and is hereby incorporated by reference. In this embodiment, the CIPP liner 10 is prevented from being unwound from core 42 by pulling on an exposed end.

In some embodiments, the drive unit 50 comprises a variable speed hydraulic motor. This can be useful when a CIPP liner 10 wound around reel 40 is being pulled through an access opening 14. Complementary rotation of reel 40 will reduce the amount of force necessary to pull the CIPP liner 10 through the access opening 14. However, the rate at which the CIPP liner 10 is pulled through the access opening 14 is subject to variation. The use of a variable speed motor allows the rotation speed of reel 40 to be adjusted to match the pull rate at a given moment.

E. Operation of Preferred Embodiment.

Figure 13:
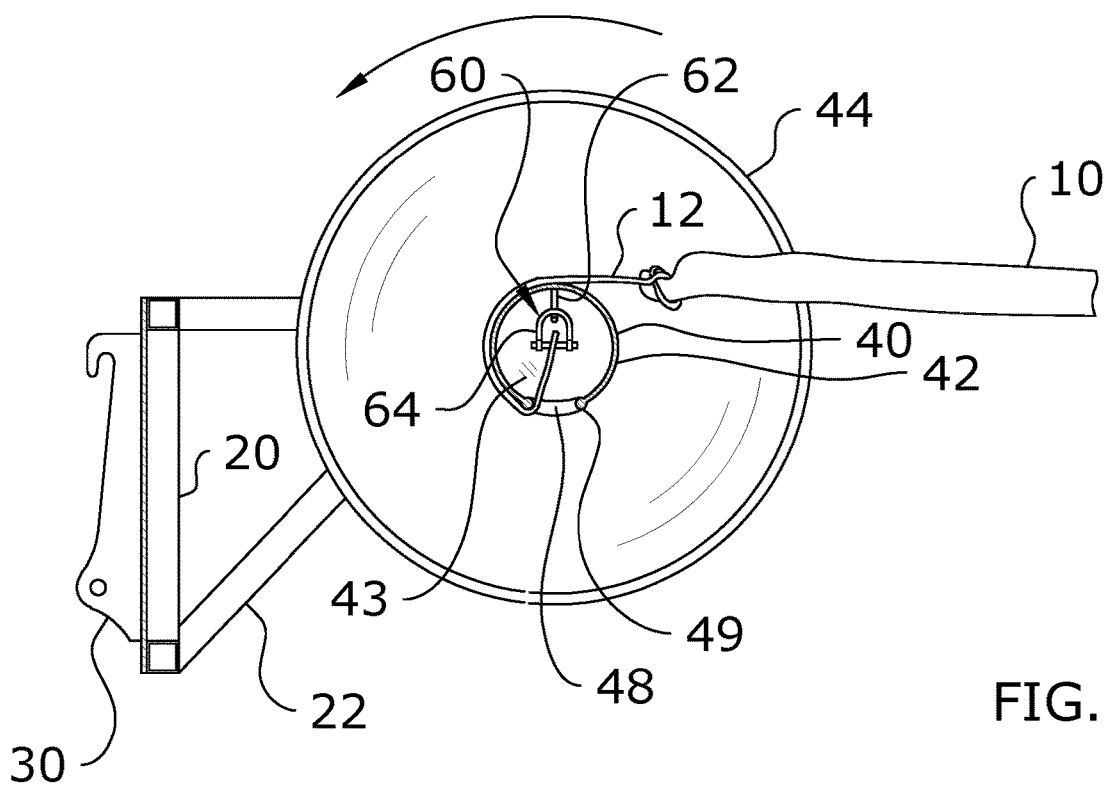
FIG. 13 is a right-side cross-section view of the CIPP liner reel system shown in FIG. 12 with the strap partially wound around the core of the reel.
Figure 14:
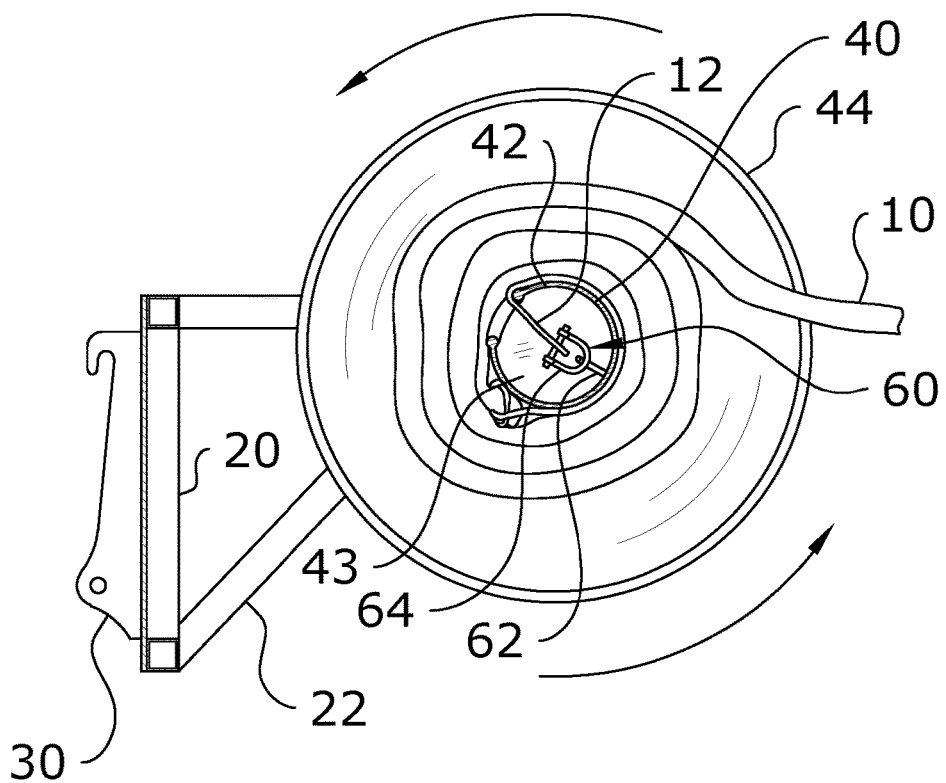
FIG. 14 is a right-side cross-section view of the CIPP liner reel system shown in FIGS. 12 and 13 with a portion of the CIPP liner wound around the core of the reel.
Figure 15:
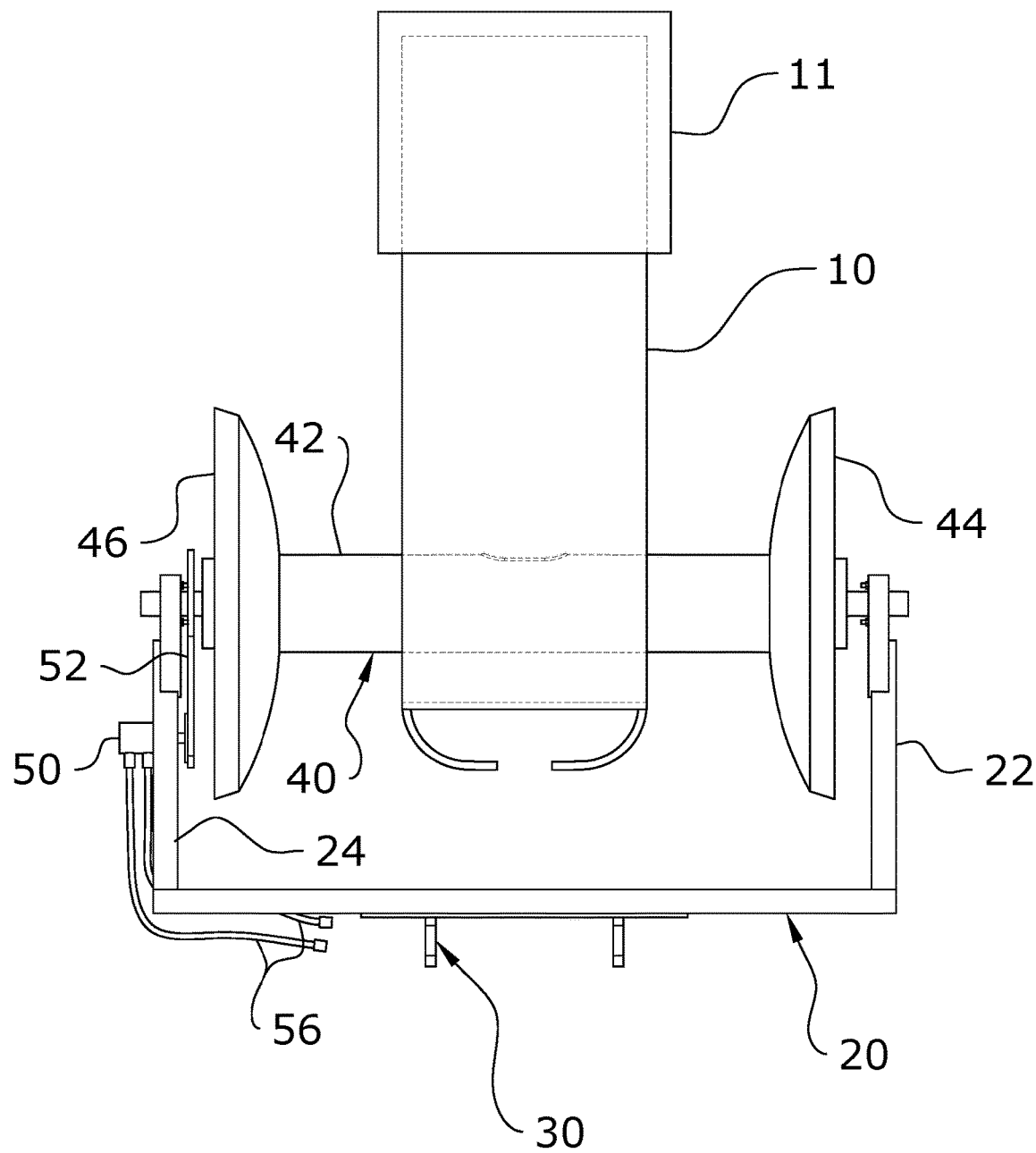
FIG. 15 is a bottom-up view of CIPP liner being pulled from a liner box using a CIPP liner reel system in accordance with an example embodiment.

As shown in FIGS. 17 and 18, the CIPP liner reel system can be coupled to a tractor prior to being used to transport CIPP liner 10. As shown in FIG. 17, CIPP liner 10 can be transported in a storage container 17 that comprises a side door 18 and a rear door 19. Initially, strap 12 is coupled to connector unit 60 through opening 48 in core 42 of reel 40. Strap 12 is also coupled to an end of CIPP liner 10. The couplings of strap 12 can be performed in any order. Once both ends of strap 12 have been securely attached, drive unit 50 is engaged to rotate reel 40 such that strap 12 and CIPP liner 10 are wound around core 42 over the top. As viewed from the side of frame 20 containing drive unit 50, this would be counter-clockwise as shown in FIGS. 13 and 14. Once the desired amount of CIPP liner 10 has been wound around core 42, the CIPP liner 10 is cut, and both cut ends are covered to prevent premature curing.

Then, the CIPP liner reel system is transported to the vicinity of the access opening 14 where the CIPP liner 10 will be inserted. A pulling cable 13 is attached to the cut end of the CIPP liner 10. Via whatever mechanism is appropriate for the task, the other end of the pulling cable 13 is inserted into the access opening 14 and is subsequently pulled to cause the CIPP liner 10 to be inserted into the access opening 14. Either in response to or in coordination with the CIPP liner 10 being pulled into the access opening 14, the drive unit 50 is engaged to cause the CIPP liner 10 to unwind from the core 42. Either automatically or manually, the rotation of the reel system is adjusted such that there is enough slack in the CIPP liner 10 to enable it to be pulled through the access opening 14 but not so much slack that the CIPP liner 10 forms a pile.

Figure 16:
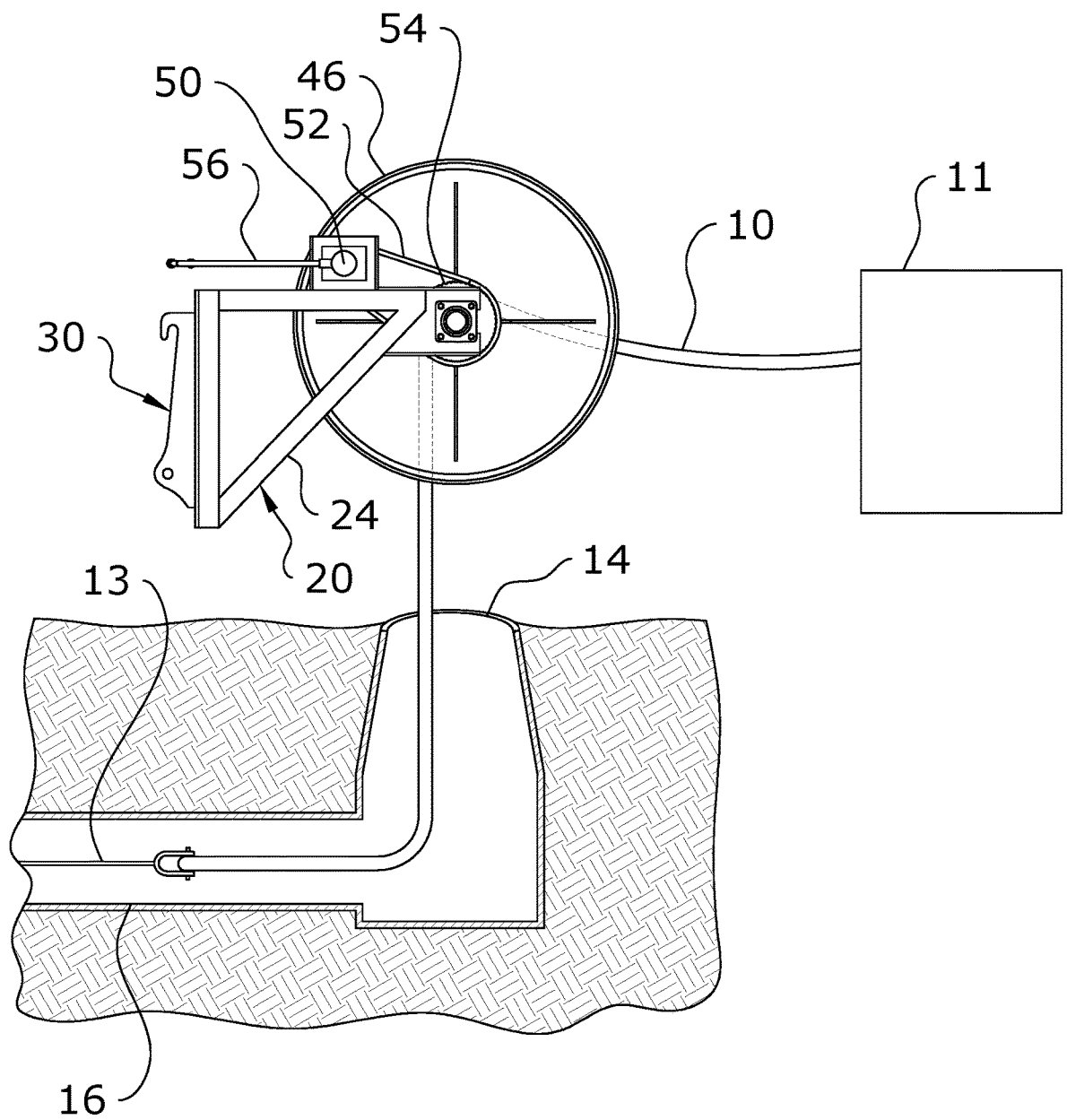
FIG. 16 is a right-side view of CIPP liner being pulled from a liner box and inserted into an access opening with the aid of a CIPP liner reel system in accordance with an example embodiment.

In another embodiment, as shown in FIG. 16, CIPP liner 10 can be passed over the top of core 42 without being wrapped around it. The exposed end of CIPP liner 10 is attached to pulling cable 13 which is configured to pull CIPP Liner 10 through access opening 14 and into conduit 16. The presence of reel 40 alters the direction at which the CIPP liner 10 is pulled from liner box 11 into access opening 14. Instead of scraping along the side of access opening 14, the CIPP liner 10 can be removed from the liner box 11 horizontally and inserted into access opening 14 vertically. By engaging drive unit 50, tension can be avoided in CIPP liner 10 to reduce the tendency for it to scrape the sides of the access opening 14 or the entry way into conduit 16 as it is being pulled through conduit 16.

Unless otherwise defined, all technical and scientific terms used herein have the same meaning as commonly understood by one of ordinary skill in the art to which this invention belongs. Although methods and materials similar to or equivalent to those described herein can be used in the practice or testing of the CIPP liner reel system, suitable methods and materials are described above. All publications, patent applications, patents, and other references mentioned herein are incorporated by reference in their entirety to the extent allowed by applicable law and regulations. The CIPP liner reel system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A CIPP liner reel system, comprising:
   a frame having a left side and a right side;

a reel for deploying a CIPP liner, wherein the CIPP liner is wound around the reel, the reel comprising:
  a core having a left end and an opposing right end;
  a left guide member attached to the left end of the core and coupled to the left side of the frame;
  a right guide member attached to the right end of the core and coupled to the right side of the frame;
  wherein the core comprises an opening disposed between the left guide member and the right guide member; and
  wherein the axis of rotation of the reel is substantially perpendicular to the right guide member and the left guide member;
a connector unit disposed within the core and configured for connecting to the CIPP liner through the opening in the core; and
a drive unit operatively coupled to the core and configured to control rotation of the reel along its axis of rotation.

2. The CIPP liner reel system of claim 1, wherein the core is a hollow cylinder.

3. The CIPP liner reel system of claim 2, wherein the left guide member and the right guide member have substantially the same shape.

4. The CIPP liner reel system of claim 3, wherein the left guide member is convex relative to the core and concave relative to the left side of the frame; and wherein the right guide member is convex relative to the core and concave relative to the right side of the frame.

5. The CIPP liner reel system of claim 4, wherein the left guide member is centered on the axis of rotation and substantially perpendicular to the axis of rotation, and wherein the right guide member is centered on the axis of rotation and substantially parallel to the left guide member.

6. The CIPP liner reel system of claim 1, wherein the left guide member is coupled to the left side of the frame using an axle; and the right guide member is coupled to the right side of the frame using an axle.

7. The CIPP liner reel system of claim 6, further comprising a sprocket operatively coupled to the core such that rotation of the sprocket will cause rotation of the core; and wherein the drive unit is operatively coupled to the sprocket using a chain.

8. The CIPP liner reel system of claim 1, wherein the opening in the core is located substantially equidistant from the left guide member and the right guide member.

9. The CIPP liner reel system of claim 1, wherein the drive unit is powered by hydraulics.

10. The CIPP liner reel system of claim 9, wherein the drive unit is a variable speed braking motor.

11. The CIPP liner reel system of claim 1, wherein the frame is configured to independently support the reel above the ground.

12. The CIPP liner reel system of claim 1, further comprising a tractor connector attached to the frame configured to allow a tractor to transport the CIPP liner reel system without affecting its operation.

13. The CIPP liner reel system of claim 1, wherein the connector unit is coupled to a CIPP liner using a strap as an intermediary.

14. The CIPP liner reel system of claim 1, wherein the core is configured to move a CIPP liner that is in contact with the core but not wrapped around the core.

15. The CIPP liner reel system of claim 1, wherein the drive unit is configured to inhibit rotation of the core.

16. The CIPP liner reel system of claim 1, wherein the reel comprises an intermediate guide member attached to the core between the left guide member and right guide member.

17. The CIPP liner reel system of claim 16, wherein the core comprises an opening disposed between each pair of adjacent guide members; wherein the core comprises at least one connector unit per opening; and wherein each connector unit is configured for connecting through at least one of the openings in the core.

18. The CIPP liner reel system of claim 16, wherein the intermediate guide member can be detached from the core.

19. The CIPP liner reel system of claim 16, wherein the intermediate guide member can be repositioned along the core without being detached from the core.

20. A CIPP liner reel system, comprising:
  a frame having a left side and a right side;
  a reel including a CIPP liner wound around the reel, the reel comprising:
    a hollow cylindrical core having a left end and an opposing right end;
    a left guide member attached to the left end of the core and coupled to the left side of the frame using an axle;
    a right guide member attached to the right end of the core and coupled to the right side of the frame using an axle;
    wherein the right guide member has substantially the same shape as the left guide member;
    wherein the left guide member is convex relative to the core and concave relative to the left side of the frame;
    wherein the right guide member is convex relative to the core and concave relative to the right side of the frame;
    wherein the core comprises an opening disposed substantially equidistant from the left guide member and the right guide member; and
    wherein the axis of rotation of the reel is substantially perpendicular to the right guide member and the left guide member;
  a connector unit disposed within the core and configured for connecting to the CIPP liner through the opening in the core;
  a sprocket operatively coupled to the core such that rotation of the sprocket will cause rotation of the core;
  a hydraulic drive unit operatively coupled to the sprocket using a chain and configured to control rotation of the core; and
  a tractor connector attached to the frame configured to allow a tractor to transport the CIPP liner reel system without affecting its operation.

* * * * *